O. T. DE LONG.
CLAMP FOR VULCANIZING MACHINES.
APPLICATION FILED FEB. 16, 1920.

1,347,213.

Patented July 20, 1920.

Inventor
Oscar T. De Long.

By Thomas Appleman
Attorney

UNITED STATES PATENT OFFICE.

OSCAR T. DE LONG, OF ATLANTA, GEORGIA.

CLAMP FOR VULCANIZING-MACHINES.

1,347,213.  Specification of Letters Patent.  Patented July 20, 1920.

Application filed February 16, 1920. Serial No. 358,976.

*To all whom it may concern:*

Be it known that I, OSCAR T. DE LONG, a citizen of the United States of America, and resident of Atlanta, in the county of Fulton and State of Georgia, have invented certain new and useful Improvements in Clamps for Vulcanizing-Machines, of which the following is a specification.

This invention relates to improvements in vulcanizing machines and particularly to clamps employed for holding the tire and parts associated with the tire during the vulcanizing process in proper assembled relation in the vulcanizer, and the said invention has relation more particularly to a novel clamp adapted to be operated for holding the parts in assembled relation and for increasing the durability of the clamp so that the cost of maintenance of a vulcanizing machine will be reduced.

A further object of this invention is to provide a novel screw engaging member associated with a clamp, the said screw engaging member being removable for the purpose of renewing the screw threaded portion of the clamp which speedily becomes impaired due to the threads wearing when the device is in constant use.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
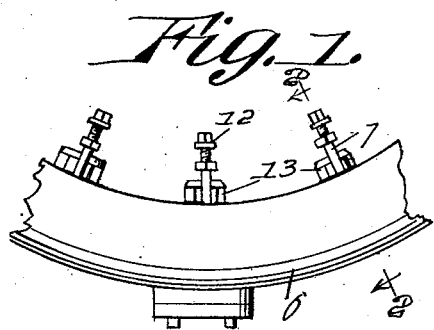
Figure 1 is a view in elevation of a fragment of a tire vulcanizing machine showing the tire holding clamps.
Figure 2:
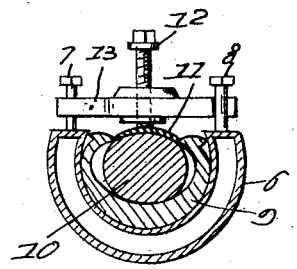
Fig. 2 is a sectional view on the line 2—2 of Fig. 1.
Figure 3:
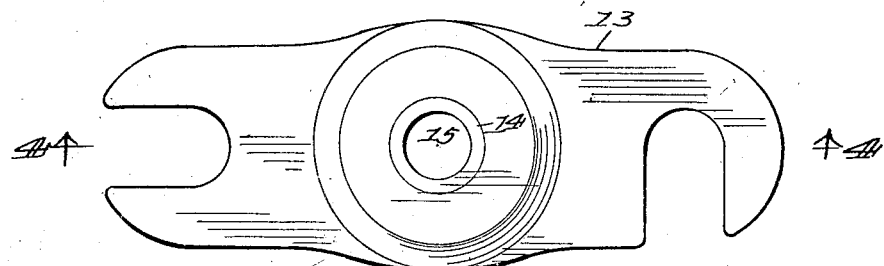
Fig. 3 is a plan view of a clamp embodying the invention.
Figure 4:
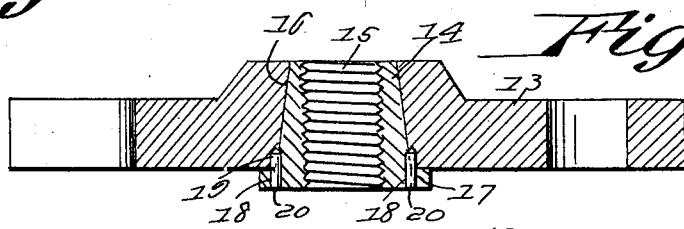
Fig. 4 is a sectional view on the line 4—4 of Fig. 3.
Figure 5:
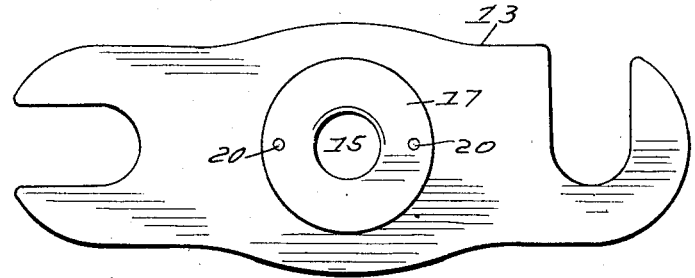
Fig. 5 is a plan view of one of the clamps on the side opposite that shown in Fig. 2.

In order to illustrate the invention and its utility, I have shown it associated with the usual vulcanizing tire holder 6 with the studs 7 and 8 which are employed to engage a clamp, secured thereto. I also show the tire 9 and the core 10, which is usually some yieldable device adapted to be pressed against the tire for holding it in contact with the vulcanizing surface of the machine. A plate 11 is used for exerting pressure through the medium of a screw 12 which is threaded in the clamp 13 and a plurality of these devices are usually employed on each vulcanizing machine.

As stated, this invention has to do with the clamp 13 which engages the studs and forms an anchorage for the screw while it is forcing the plate against the core and as usually made, these clamps have threaded apertures for engaging the screw. It has been found in practice, however, that these screw threads rapidly deteriorate by reason of friction between the screw and the threads of the clamp, and it is the purpose of this invention to produce novel means whereby the bodies of the clamp may be used again and again, and to provide the said clamps with bushings 14 having threaded apertures 15 to engage the screws 12.

In carrying this invention into practice, I preferably form the apertures 16 in the clamps with walls that taper from the lower to the upper side of the said clamp and I provide the bushings 14 with correspondingly shaped outer walls so that they fit the sockets of the clamps and as the pressure on these clamps is upwardly, it follows that the greater the pressure the more firmly will the bushings be forced into the sockets of the clamps. I furthermore provide the lower ends of the bushings with laterally extended flanges 17 provided with apertures 18, and I also form recesses 19 in the edges of the bushings and clamp at the joint of the said bushings and clamp to form seats for the pins 20 which are inserted in the apertures of the flanges of the bushings so that the bushings are prevented from rotating while the screws are being threaded in them.

It is preferable that these bushings be removable so that new ones can be substituted when the old ones become worn, and this can be accomplished by force exerted on the small ends of the bushings to dislodge them from the seats in the clamps and thereafter the new bushings may be inserted and the old clamps will thus be restored to full utility without undue loss.

I claim—

1. In a clamp for vulcanizing machines, a clamping member having means of attachment to a vulcanizing machine, the said clamp having an upwardly tapered seat and a bushing of like configuration fitting in the seat with means for preventing rotation of the bushing with relation to the clamp.

2. In a clamp for vulcanizing machines, a clamp having a seat with upwardly tapered walls fitting the socket of the clamp, a laterally extending flange on the lower end of the bushing, and means extending through the flange and anchored in the clamp for preventing rotation of the bushing with relation to the clamp.

OSCAR T. DE LONG.